June 19, 1956 J. HERTRICH 2,751,083
CENTRIFUGAL CHARGING APPARATUS
Filed Oct. 19, 1951 2 Sheets-Sheet 1
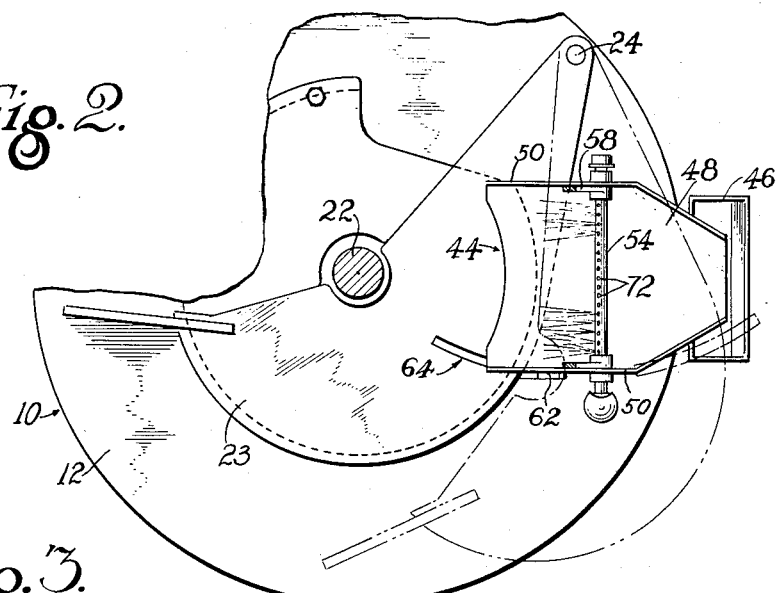
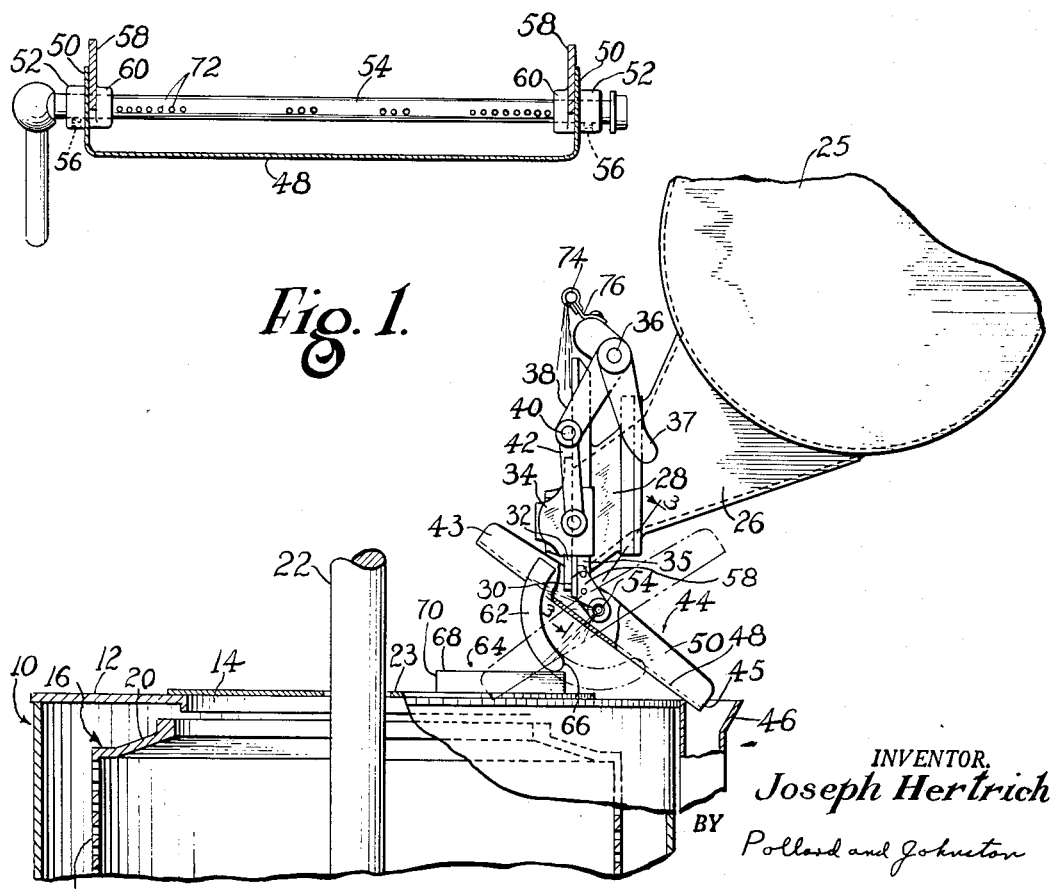
INVENTOR.
Joseph Hertrich
BY
Pollard and Johnston
ATTORNEYS June 19, 1956   J. HERTRICH   2,751,083
CENTRIFUGAL CHARGING APPARATUS
Filed Oct. 19, 1951   2 Sheets-Sheet 2

INVENTOR.
Joseph Hertrich
BY
Pollard and Johnston
ATTORNEYS

United States Patent Office 2,751,083
Patented June 19, 1956

2,751,083
CENTRIFUGAL CHARGING APPARATUS

Joseph Hertrich, Hamilton, Ohio, assignor to The Western States Machine Company, Hamilton, Ohio, a corporation of Utah Application October 19, 1951, Serial No. 252,076

8 Claims. (Cl. 210—63)

This invention relates to new and useful improvements in centrifugal charging apparatus and more particularly to new drip pan arrangements for improving operations attendant to the loading of material such as sugar massecuite or magma through a loading gate into an adjacent centrifugal machine.

In the manufacture of sugar, a supply tank or "mixer" is usually provided adjacent to a group of centrifugal machines to hold a comparatively large quantity of the material to be centrifuged, and loading spouts extend from the bottom of this tank to gate-controlled outlets from which the material can flow into the baskets of the respective centrifugal machines through opening in the tops thereof. At the beginning of each centrifugal operating cycle a loading gate is opened while the centrifugal basket is rotated at a suitable loading speed, and when a charge of the desired thickness has formed in the basket the loading gate is closed, to remain closed until after the charge has been processed and discharged.

A drip pan commonly is associated with the loading gate to guide the flow of material into the basket while the gate is open and to catch drippings from the closed gate. The drip pan also catches the material which the gate finally pinches off in reaching its closed position. An attendant generally scrapes this material from the drip pan by means of a hand paddle and deposits it into the rotating basket. That practice, however, has at least two shortcomings, for it is quite tiring to attendants and it results in the basket charge being blemished or rendered non-uniform by the scrapings from the drip pan.

Furthermore, the drip pans commonly used become easily encrusted with adhering material, and where used with leaky gates they allow material to spill over onto the centrifugal curbs or into parts of a spinning basket charge.

An object of this invention is to provide arrangements of loading gates and drip pans whereby centrifugal attendants may be relieved of the tiring work of scraping out a drip pan in connection with each centrifugal loading operation. Another object is to provide for positively guided flow of loading gate drippings to a collecting channel outside the centrifugal basket, so that the centrifugal charge and the curb as well as the drip pan can be easily kept clean and free of objectionable material.

According to this invention, instead of merely having a drip pan extend forward from beneath the closed position of a loading gate for collection of material or drippings that may be scraped from the pan into the centrifugal basket, a drip pan is arranged to slope from beneath the closed gate so as to lead material falling from it into a suitable collecting channel outside the centrifugal basket, and provision is made for subjecting this pan to the action of a washing fluid, such as water, so that material falling into the pan flows freely or is washed into the collector. In the course of a loading operation, while the loading gate is open to deliver material into the centrifugal basket, the drip pan must have another position where it offers no obstruction to the loading operation. Accordingly, it is made movable from the material collecting position to an unobstructing or loading position, and the movements between these positions are controlled in coordination with the loading operations, preferably by arranging the drip pan so that it is positioned according to the position of a curb cover element which is kept open during each loading operation and moved to a closed position when the basket has been charged.

In one embodiment of the invention the drip pan is kept beneath the loading spout and subject to a washing spray at all times, its loading position being one in which it tilts forward to slope downward towards the basket opening and assist the flow of material from the loading gate into the basket. That position is assumed when the curb cover element is moved to open position in preparation for a loading operation, and when the cover element afterward is closed the drip pan is tilted to a backwardly sloping position in which it discharges directly into a dripping collector at the back of the centrifugal machine.

According to another embodiment, the loading spout is arranged with its gate directly over the top opening of the centrifugal basket, so that all material flowing past the gate normally falls directly into the basket. Here the drip pan is mounted to slope backwardly from beneath the gate to the drippings collector when the curb cover element is closed, and is displaced away from the gate, to a position where it still delivers into the collector, when the cover element is moved to open position.

The foregoing and other objects, features and advantages of the invention will be apparent from the following detailed description of illustrative embodiments thereof, when considered in connection with the accompanying drawings in which:

Figure 1 is a schematic side elevation, partly in section, of an arrangement provided according one embodiment of the invention;

Figure 2 is a plan view of the centrifugal casing top and drip pan in the arrangement of Figure 1;

Figure 3 is a vertical cross section taken along line 3—3 of Fig. 1, showing the mounting of the drip pan;

Figure 5:
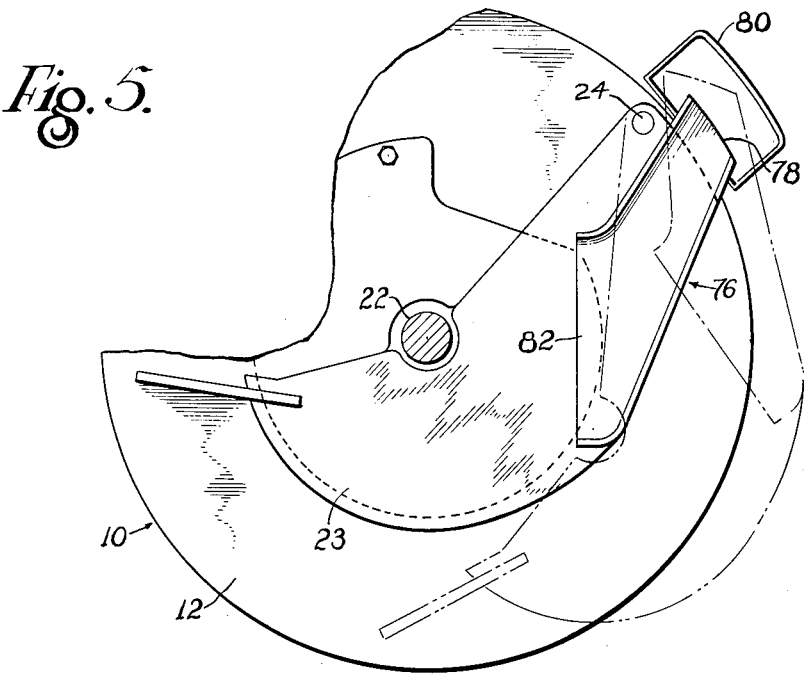
Figure 5 is a plan view of parts of the apparatus shown in Fig. 4.

In the arrangements shown for the purposes of illustrating the principles of the invention, there is provided a sugar centrifugal having a curb or casing 10 formed with a flat top 12 in which a centrally located opening 14 occurs. The curb or casing 10 surrounds a rotatable basket 16 having a perforated side wall 18 and a cap 20 formed with an opening underlying the casing opening 14. The basket is mounted in the usual manner on a spindle 22 passing through the casing and basket openings and suspended in gyratory manner from a suitable supporting structure and connected to a prime mover (both not shown). The prime mover drives the basket at a high speed to effect a separation of the syrup and a cleaning of the sugar in each charge of massecuite or magma introduced into the basket by expelling the syrup through the perforated side wall 18. The curb or casing 10 collects the expelled liquid and conducts it away by suitable means (not shown). A cover 23 is pivotally mounted at 24 on the curb top 12 for sliding movement thereover to and from a position closing the opening 14.

The massecuite or magma to be introduced into the centrifugal basket is held in a mixer tank 25 positioned adjacent one side of the centrifugal in an elevated position. From the bottom of this mixer tank a loading chute or spout 26 extends laterally and downwardly to a position overlying the curb or casing 10 and the rotatable basket 16 of the sugar centrifugal.

The flow of massecuite or magma from the mixer tank 25 is controlled by a gate construction on the lower end of the spout 26 into the centrifugal basket. The gate construction includes a hollow gate body 28 secured to the lower end of the loading spout and presenting a flat vertical face 30 having an opening through which the massecuite or magma discharges in the direction of the curb top opening 14. A gate 32 is held tightly against the face 30 in slidable relation thereto by a crosshead 34 cooperating with a slide member 35 fixed to the gate body. When the gate 32 is in its lowermost position, as illustrated in full lines in the drawings, it blocks the flow of massecuite or magma from the mixer tank through the loading spout, while upward sliding movement of the gate on the face 30 opens the spout and allows the massecuite or magma to flow out under the influence of gravity into the centrifugal machine. The gate movements are produced by rocking a shaft 36 through a radially extending arm 37 by a suitable means such as a fluid pressure operated cylinder and piston device (not shown). A radial arm 38 rigidly fixed to a shaft 36 is pivotally connected at 40 with a link 42 pivoted to the gate actuating crosshead 34. In operation rocking of the shaft 36 swings arm 38 through an arc which slides the crosshead 34 and gate 32 up and down by pulling and pushing on link 42.

Referring more particularly to Figs. 1–3, an elongated drip pan 44 has been provided which is pivotally mounted intermediate its ends between the gate 32 and the curb top 12 and extends forward and backward from said gate so that when its forward portion 43 is tilted downwardly it conveys material falling from the gate into the centrifugal and when its backward portion 45 is tilted downwardly it conveys such material into a collecting space outside of the basket, for example, into collector 46 mounted on the side of the curb or casing 10.

The movements of this drip pan 44 have been coordinated with the opening and closing movements of the cover 23 for the curb opening 14 so that its backward portion 45 will be down when the cover 23 is in closed position and its forward portion 43 may be tilted downward when the cover has been moved to a position uncovering the opening.

More specifically, the elongated drip pan 44 is formed with a flat bottom 48 and side flanges 50 upturned therefrom to define a trough which guides fluid material therein in the longitudinal direction thereof. Each of the side flanges is provided with bosses 52 through which passes a rotatable pipe 54. The pan is fixed to the pipe by set screws 56 so that the pan and the pipe rotate together about the axis of the pipe.

As seen in Fig. 1, the pipe 54 is mounted below and to the rear of the flat vertical gate face 30 so as not to be in the path of material flowing downward and forward from the spout 26. To so support the pipe, brackets 58 are secured to the lower portions of the crosshead slide member 35 to depend downwardly and rearwardly therefrom. The lower ends of the brackets are formed with bearings 60 in which the pipe 54 is rotatably supported.

To coordinate the movements of the drip pan with those of the cover 23, an arm 62 is mounted on the drip pan 44 to depend therefrom and engage an elongated abutment or cam 64 which is fixed to and moves with the cover 23. The arm 62 is fixed as by welding to an upturned side 50 on the forward portion 43 of the drip pan, from which it depends downwardly and rearwardly in an arc to terminate in a generally rounded end 66.

The elongated abutment or cam 64 on the cover may be curved horizontally so as to lie on an arc from the pivot point 24 of the cover 23 and is provided with a flat upper surface 68 and a flat vertical surface 70 on the inner end. This abutment is so placed on the cover 23 that when the cover is in closed position it lies directly underneath the depending arm 62, the rounded end 66 of which rests on the flat upper surface 68 of the abutment. Thus the forward end of the drip pan is held in raised position while the cover is closed and conveys material dripping from the gate backward to the collector 46. When the cover is slid to open position the abutment moves from beneath the depending arm 62, permitting it to descend. The pan then is free to tilt downward at its forward end under the weight ahead of its pivotal connection with the pipe 54, so as to guide material flowing from the loading spout 26 through the casing opening 14 into the open top of basket 16.

The opening movement of the cover takes place just before the gate 32 is opened to start a loading operation. The centrifugal basket then is usually rotating at a loading speed, so that charge material then entering from the opened gate walls up evenly against the side of the perforated side wall 18 of the basket under centrifugal force and forms a charge suitable for efficient treatment at high centrifugal speeds.

When the charge has reached a desired thickness, the loading gate is closed to terminate the loading operation, and then the cover 23 is again moved to closed position. This inward movement causes the end 70 of the abutment 64 to engage the rounded end 66 of the arm 62 and then to force the arm and the forward end 43 of the pan upwardly about the axis of the pipe 54. The upward movement continues until the arm 62 again rests on the upper surface 68 of the abutment 64, at which position the pan 44 slopes backward so as to conduct material falling from the gate structure to the suitably located collection container 46. If desired, the curb itself may be made to serve as the collector by arranging the drip pan to discharge into space between the basket and the curb when the gate is closed.

It will be noted that the tilting of the pan to deflect the drippings into the collector 46 is completed during the very first part of the closing movement of the cover, therey enabling it to be closed immediately after closing the gate without allowing the drippings to fall on the cover.

In order to expedite the flow of massecuite or magma on the pan a washing means is provided. As may be seen in Fig. 2 the pipe 54 to which the pan is rigidly secured is provided with a series of openings 72 extending across the width of the pan by which water is sprayed onto the pan. Because of the rigid mounting of the pan on the pipe the two must rotate as one, and thus, the spray from the openings strikes the same surface of the pan in all of its positions. As charge material passes over the downwardly tilted forward end 43 of the drip pan from the open spout 26, this spray maintains a film on the pan which keeps massecuite or magma from clinging to it and thus relieves the centrifugal attendant of much of the labor of scraping by a hand paddle as required with known apparatus.

Since the gate mechanism is likewise subject to the accumulation of syrup or crystals, a spray pipe 74 is mounted above the gate mechanism on suitable brackets 76 fixed at their lower ends to an upper portion of the spout structure. The pipe is provided with a series of openings to direct a spray of water upon the gate and the gate facing. This spray water flows down the gate structure and into the drip pan 44 which carries the washings away as described above.

This arrangement for controlling the position of the drip pan by the position of the curb cover affords a simple and reliable means of coordinating the pan movement with centrifugal loading operations. Other means of doing this may be employed, however, while still making use of an equivalent drip pan arrangement functioning in the manner of the structure here illustrated.

Figure 4:
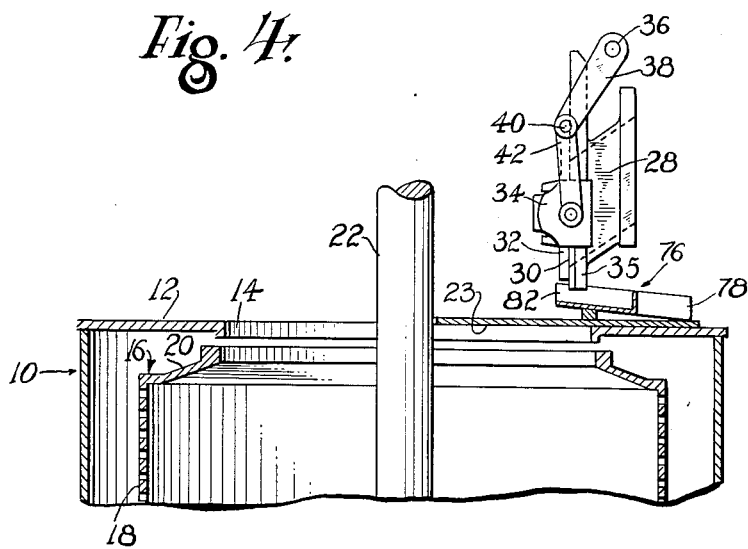
Figure 4 is a schematic side elevation, partly in section, showing an arrangement provided according to another embodiment of the invention.

Figs. 4 and 5 of the drawings illustrate a modified embodiment of the invention, in which the loading spout, the loading gate, the curb, the basket, and the sliding cover correspond substantially to the elements already described in connection with Figs. 1 to 3. In this second embodiment, however, the loading gate is located directly over the curb top opening 14, so that all drippings or other material falling from the gate while cover element 23 is in open position are sure to pass directly into the open basket 16. By this arrangement the need for a drip pan to guide material into the basket is obviated; so the drip pan can be held away from the gate in an unobstructive position as a basket loading operation takes place.

Accordingly, the drip pan in this embodiment is provided in the form of a long inclined trough 76, open upwardly and at least at its backward and lower end 78, which extends backwardly in normal position, as in the first embodiment, from a location between the gate 32 and the curb 10 to a point where its open backward end discharges into a collector 80 at the side of the curb (Fig. 5). This drip pan or trough may be fixed directly to the curb cover 23 so that when the latter is in closed position the forward end 82 of the pan lies beneath the loading gate 32 to catch any drippings or other material falling from the gate structure. When the cover element is opened in preparation for a loading operation, the pan is displaced backward to allow completely unobstructed flow of charge material into the basket, but as seen from the dotted line showing of Fig. 4, the backward or lower end 78 of the drip pan still overlies the collector 80 in that position and will discharge into the collector in all positions of the cover 23. Thus material flowing along the pan may continue to discharge into the collector even after the pan has been displaced from beneath the loading gate and during each loading operation.

It will be understood that the present invention is not restricted to the details of construction which are described herein for clarity of illustration but that it extends to equivalent features and constructions within the spirit of the disclosure and the scope of the appended claims.

I claim:

1. In centrifugal apparatus including a rotatable basket having a top opening, a stationary surrounding casing having a top opening and a movable cover element therefor, and a loading gate located for delivery of material through said top openings, a drip pan formed to catch material falling from said loading gate, means operative normally to hold said drip pan in a normal position beneath said gate in which said pan receives such material, an open top collector at a side of said casing, said pan in said normal position sloping downwardly from said gate over the casing to a lower end overlying the top of said collector, said lower end providing an outlet leading into said collector for draining such material into the collector, and means responsive respectively to opening and closing movements of said cover element for displacing the drip pan from normal position to a position not obstructing such delivery and for returning the drip pan to normal position, said outlet being spaced above and overlying said collector in all the positions of said pan so that material falling at any time from said outlet will enter said collector.

2. In centrifugal apparatus including a rotatable basket having an open top, a surrounding curb having an annular top open over the basket top opening, a movable curb cover element and a loading gate located for delivery of material into said basket and curb openings, an elongated drip pan beneath the loading gate arranged to receive material falling from the gate and extending both backward and forward therefrom over the curb top, each end of said pan forming an outlet for such material, a drippings collector adjacent the backward end of said pan, cooperating means respectively on said cover element and on said pan and rendered operative by closing movement of said cover element to hold the drip pan in a backwardly tilted position in which it conveys material falling from said gate through its backward outlet to said collector, and means responsive to opening movement of the cover element for shifting said pan to a forwardly tilted position in which it conveys such material through its forward outlet into said curb and basket openings.

3. In centrifugal apparatus including a rotatable basket having an open top, a surrounding curb having an annular top open over the basket top opening, a movable curb cover element and a loading gate located for delivery of material into said basket and curb openings, an elongated drip pan beneath the loading gate arranged to extend both backward and forward therefrom over the curb top, a drippings collector adjacent the backward end of said pan, cooperating means respectively on said cover element and on said pan and rendered operative by closing movement of said cover element to hold the drip pan in a backwardly tilted position in which it conveys material falling from said gate through its backward outlet to said collector, means responsive to opening movement of the cover element for shifting said pan to a forwardly tilted position in which it conveys such material through its forward outlet into said curb and basket openings, and means for continuously spraying wash liquid to the face of said drip pan.

4. In centrifugal apparatus, a drip pan in the form of a substantially straight elongated trough open upwardly and at both ends and swivel means intermediate said ends for mounting the pan on a horizontal axis between a centrifugal loading gate and an underlying centrally open centrifugal curb top, the pan extending forward and backward from and being swingable on said swivel means so as either to tilt the forward end downward to convey material falling from said gate into the curb top opening or to tilt the backward end downward to convey such material into a collector, an arm extending downward from part of said pan, and a horizontally slidable cover element for the curb top opening carrying means cooperative with said arm to tilt said pan backward as the cover element is closed.

5. In centrifugal apparatus including a rotatable basket having a top opening, a surrounding curb having a top opening over the basket top opening, a movable curb cover element to close said curb top opening and a loading gate located for delivery of material into said basket and curb openings, a drip pan beneath said loading gate in the form of an elongated upwardly open trough having its bottom sloping downwardly to a drippings outlet at one end of the trough, a stationary drippings collector below said trough outlet, said pan being movable between a normal position in which it underlies the loading gate with said outlet overlying said collector and another position in which it is displaced from beneath said gate, and means responsive to movement of said cover element for moving said drip pan to said normal position when said cover element is closed and moving said drip pan to said other position when said cover element is opened, said outlet overlying said collector in all the positions of said pan so that material falling at any time from said outlet will enter said collector.

6. In centrifugal apparatus including a rotatable basket having a top opening, a surrounding stationary casing having a top opening, a cover element movable to close and open said casing opening, and a loading gate located for delivery of material through said top openings, a drip pan below said gate in the form of an elongated trough open upwardly to catch material falling from said loading gate, an open top collector in a fixed position adjacent said casing, means mounting said drip pan for movement in a horizontal path between a normal position in which it underlies said gate to receive such material and another position in which it is displaced from beneath said gate, the bottom of said pan sloping downwardly to a lower open end forming an outlet overlying the top of said collector for draining such material into the collector, and means responsive to the opening and closing movements, respectively, of said cover element for displacing the pan from said normal position to said other position, said outlet being spaced above and overlying said collector in all the positions of said pan so that material falling at any time from said outlet will enter said collector.

7. In centrifugal apparatus including a rotatable basket having a top opening, a surrounding stationary casing having a top opening, and a loading gate located for delivery of material through said top openings, a horizontally slidable cover element for the casing opening, a drip pan in the form of an upwardly open sloped trough below said gate and having a drippings outlet at one end, a collector below said trough outlet but outside said basket, said pan being movable in a horizontal path between a normal position in which it underlies the loading gate with said outlet overlying said collector and another position in which it is displaced from beneath said gate, said trough being moved with said cover element so that it is disposed in said normal position when said cover element is closed and is moved to said other position when said cover element is opened.

8. An apparatus as described in claim 3, said pan being swiveled intermediate its ends on a horizontal spray pipe that swings with the movement of said pan and constitutes a part of said means for spraying liquid to the face of the pan.

References Cited in the file of this patent

UNITED STATES PATENTS

| | | |
|---|---|---|
| 1,138,608 | Dibbets | May 4, 1915 |
| 1,652,680 | Olsen | Dec. 13, 1927 |
| 1,811,969 | Rosenfeld | June 30, 1931 |
| 1,820,262 | Wilkinson | Aug. 25, 1931 |
| 2,070,152 | Bennett | Feb. 9, 1937 |
| 2,105,059 | Steps | Jan. 11, 1938 |
| 2,254,388 | Olcott | Sept. 2, 1941 |
| 2,328,394 | Neuman | Aug. 31, 1943 |
| 2,461,741 | Kochli et al. | Feb. 15, 1949 |
| 2,638,225 | Cox | May 12, 1953 |

FOREIGN PATENTS

| | | |
|---|---|---|
| 535,060 | Germany | Oct. 5, 1931 |
| 575,736 | Germany | May 2, 1933 |